Dec. 19, 1944. H. H. VANDERZEE 2,365,228
CHAIN
Filed Aug. 28, 1941
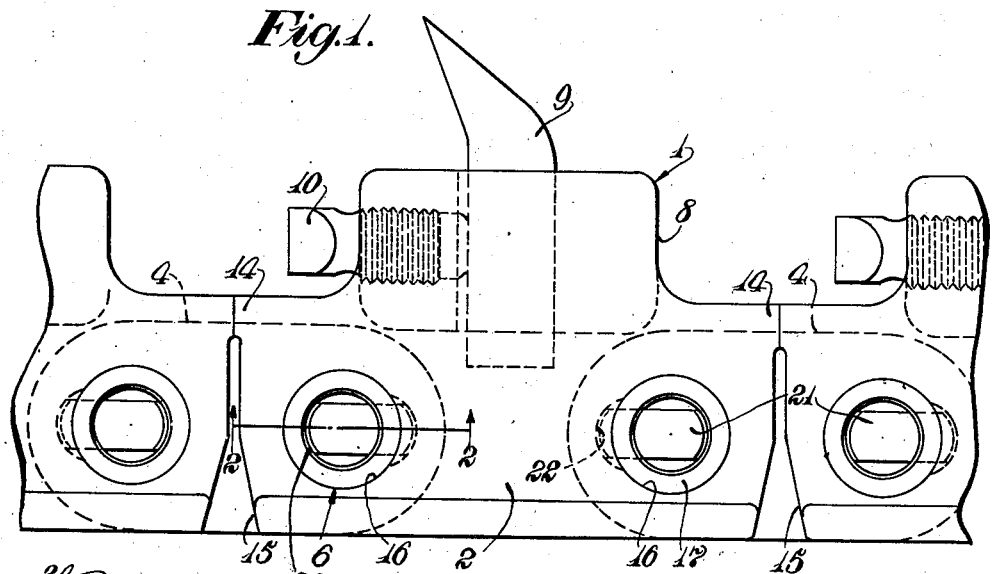
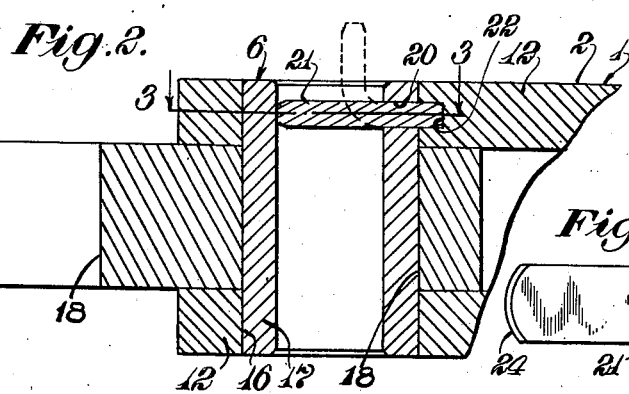
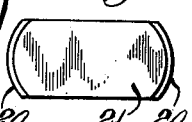
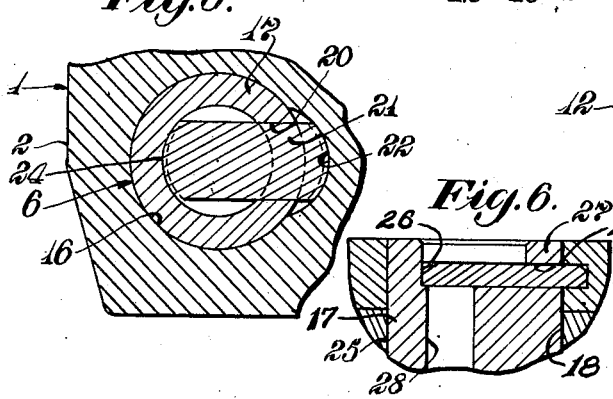
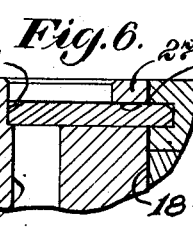
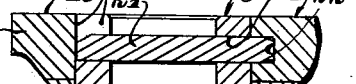
Inventor:
Harry H. Vanderzee.
by Ennis A. Maxson.
Att'y.

Patented Dec. 19, 1944

2,365,228

UNITED STATES PATENT OFFICE 2,365,228

CHAIN

Harry H. Vanderzee, Michigan City, Ind., assignor to Sullivan Machinery Company, a corporation of Massachusetts Application August 28, 1941, Serial No. 408,669

18 Claims. (Cl. 74—254)

This invention relates to pivotal connections for interconnecting the adjacent links of a chain, and more particularly to such a connection for the links of a cutter chain adapted for use with a mining machine.

It is necessary, practically speaking, that the pivotal connection for the links of a cutter chain for coal cutting machines be constructed of material which is capable of withstanding during long periods of time the shearing stresses to which they are subjected by the loads on the chain. And since the loads on the chain are heavy, as they are on a cutter chain for a mining machine, the pivot members for the links of the chain must be constructed of a material which is so hard that it cannot be easily shaped, after the members are inserted in the chain, to hold them in place.

An object of the invention is to provide an improved pivotal connection for the links of a chain. Another object is to provide an improved connecting link structure in which the connecting member is made of a hard and wear resistant material. Still another object is to provide an improved pivot member for connecting the links of a cutter chain, and to provide improved means, associated therewith, for locking said pivot member against movement relative to one of said links. Still another object is to provide an improved connecting link structure for a cutter chain, including a pivot member extending through openings adjacent the ends of the chain links, and means for locking said pivot member in a position so that the latter presents a smooth unbroken surface to the links at points where the load is applied. A still further object of the invention is to provide an improved pivotal connection for the elements of a chain, possessing the capacity simply but surely to be locked in place, but yet readily releasable when this is necessary. Other objects and advantages of the invention will, however, hereinafter more fully appear.

In the accompanying drawing there are shown for purposes of illustration one form and two modifications which the invention may assume in practice.

In the drawing:

Fig. 1 is a side elevational view of a portion of a cutter chain in which my improved pivotal connection is incorporated.

Fig. 2 is an enlarged horizontal sectional view taken on the plane of the line 2—2 of Fig. 1.

Fig. 3 is a fragmentary sectional view taken on the line 3—3 of Fig. 2.

Fig. 4 is a view in elevation of the locking member for the pivotal connection in unbent condition.

Fig. 5 is an edge view of the locking member bent for insertion or withdrawal.

Fig. 6 is a fragmentary sectional view on a plane corresponding to that of Fig. 2 showing a modification.

Fig. 7 is another fragmentary sectional view on a similar plane showing a further modification.

Referring to the drawing, and at first to Figs. 1 to 5 inclusive thereof, it will be noted that there is shown a cutter chain, generally designated 1, comprising bit carrying chain elements or links 2, and chain elements or link members 4 pivotally connected to the links 2 by pivotal connections which are generally designated 6.

Each bit carrying link 2 is provided with a lug portion 8 having a recess opening through its upper surface for receiving a cutter bit 9 which is clamped within the recess by any suitable clamping means such as a set screw 10 threaded into an opening in an end of the lug portion and acting against the shank of the cutter bit. Connected integrally to the lug portion 8 adjacent its opposite sides are depending side plates or leg portions 12 which are spaced from each other as shown in Fig. 2, and which extend parallel to the path of movement of the chain. The side plates 12 extend beyond the ends of the lug portion 8 and are provided, at their ends, with abutment portions 14 which are adapted to abut similar portions on the side plates of adjacent bit carrying links for limiting the turning of these links about their pivots in one direction to positions in which the links are in alinement with each other. The ends of the side plates are cut away below the abutment portions 14, as shown at 15, to permit the bit-carrying links to swing about their pivots in the opposite direction and to conform to a cutter chain driving sprocket (not shown). Formed in the side plates 12 adjacent their ends, are alined bores or openings 16 for receiving a tubular pivot member or pivot pin 17 of one of the pivotal connections 6. The link members 4 extend between the side plates 12, and a bore or opening 18 is provided adjacent each end of each member 4 for receiving the pivot member 17. It will be understood, however, that my improved pivotal connection may be used to advantage in any chain link assembly in which a pivotal connection is to be established.

The pivot member 17 of each pivotal connection 6, as illustrated in Figs. 1, 2 and 3, is a cylindrical, sleeve-shaped or tubular member of suitable hardness to provide the necessary durability. Extending through this member in its portion which is received within the opening through one of the side plates, is a radial opening or bore 20 for receiving a locking member 21. This locking member has a locking portion and another portion flexible relative to the locking portion, as will hereinafter become apparent. Formed in the wall of the opening 16 in one of the side plates 12 is an opening in the form of an arcuate recess or slot 22, herein shown as having its bottom of the same curvature as the inner wall of the tubular pivot member 17. It will be understood that this arc may be formed on a different radius or of different curvature if desired without departing from my invention in its broader aspects, but the construction shown is desirable for reasons which will later appear. The opening or recess 22 is formed in the rearward wall of the opening 16 so that the pivot member presents a smooth unbroken surface to the forward wall of the opening 16 when the pivot member is turned to a position with its opening or bore 20 communicating with the recess 22, thereby providing a stronger construction which is better able to carry the heavy loads on the chain.

The locking member 21 is shown here as having a rectangular shaped cross section and rounded ends 24 which are of the same curvature as the inner wall of the sleeve-shaped pivot member 17 and the slot 22. This locking member is desirably made of a tough material which may be readily deformed without fracture, such as wrought iron or mild steel.

To interconnect the chain links, the tubular pivot member 17 is passed through the alined openings 16 in the side plates 12 of the bit-carrying link, and through an opening 18 in one of the links 4. The member 17 is positioned so that the axis of its opening or bore 20 is alined with the center of the arcuate recess 22 in the side plate 12. The locking member 21 is then bent as shown in Fig. 5, and one of its ends is passed through the opening 20 and into the opening provided by the recess 22, so that it will occupy the position shown in dotted lines in Fig. 2. The member 21 is then bent into its straightened position shown in full lines in Fig. 2, and the length of the member 21 may desirably be chosen so that the end of the member opposite the recess 22 engages the inner wall of the sleeve-shaped member 17 and, to avoid looseness, the length of the locking member 21 may be advantageously made such that it will be under longitudinal compression when in the position shown in full lines in Figs. 2 and 3. Since the locking member 21 extends through the opening 20 and has its ends in engagement with the inner wall of the tubular pivot member and with the arcuate wall of the recess 22 respectively, the pivot member 17 is locked against rotation relative to the side plate 12, and escape of the locking member is prevented; and the engagement of the locking member 21 with the sides of the recess 22 and with the walls of the opening 20 in the pivot member prevents bodily movement of the pivot member transversely relative to the chain links. If it is desired to remove the locking member 21 a rod may be extended through the sleeve-shaped pivot member and hammered to bend the locking member 21 into the dotted line position shown in Fig. 2, at which time it may be removed from the recess 22.

It will be appreciated that the pivot member or pin 17 need not be tubular, but may, as shown in Fig. 6, be in the form of a cylindrical body 25 having a bore or recess 26 in the end which is to be used for locking connection to the bit-carrying link; and that the radial opening 20 may be formed in the same relation to the pin, through the annular wall 27 surrounding the bore 26, as in the preferred embodiment of the invention. A longitudinally extending passage 28 is provided for the reception of a drift when the locking element 21 is to be bent to permit disconnection of the chain.

It will also be observed that the end of the locking element need not be held, by reason of its relation to the inner surface of the pivot element 17. Instead, a pivot element or pin 17', as shown in Fig. 7, which may be otherwise identical with the element 17, may have a slot or recess formed in its end opposite the radial opening 20, as at 29, and the locking element may be made somewhat longer and when in its straightened condition may be prevented, as shown in Fig. 7, from escape by abutment with the wall of the bore 16.

As a result of this invention there is provided an improved chain, and an improved means for pivotally connecting the links of a chain. The pivot member for the connection may be constructed of material having any desired degree of hardness, thereby assuring a long life for the connection and a decrease in the frequency and expense of repairing the chain. The links of the chain may be easily interconnected, and the connecting member is positively locked in place until it is desired to disconnect the links, at which time the locking means may be easily released. While the locking member is shown entering an opening in the bit-carrying links it will be evident it could, if desired, be arranged so that the member 17 would be held rigidly with respect to the connecting links 4 simply by forming the recess 22 in the link 4 and locating the slot 20 in the member 17 so that it would fall opposite the new position of the recess 22. Other advantages will be apparent to those skilled in the art.

While there are in this application specifically described three forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a pivotal chain link connection, in combination, chain links having openings in their adjacent ends for receiving a pivot member, a tubular pivot member extending through said openings, and means for locking said pivot member within said openings including a recess formed in one of said chain links and extending through the wall of the opening therein, an opening through the side of said tubular pivot member, and a locking member extending through said last mentioned opening into said recess and abutting at its ends the inner wall of said tubular pivot member and the bottom of said recess.

2. In a pivotal chain link connection, in combination, chain links having openings in their adjacent ends for receiving a pivot member, a sleeve-shaped pivot member extending through said openings, and means for locking said pivot member within said openings including an arcuate recess formed in one of said chain links and extending through the wall of the opening therein, an opening through the side of said sleeve-shaped pivot member, and a locking member extending through said last mentioned opening into said arcuate recess and having rounded ends pressing against the inner walls of said sleeve-shaped pivot member and of said arcuate recess.

3. In a pivotal chain link connection, in combination, chain links having openings in their adjacent ends for receiving a pivot member, a sleeve-shaped pivot member extending through said openings, and means for locking said pivot member within said openings including a slot formed in one of said chain links, through the wall of the opening therein and having a curved inner wall, an opening through the side of said sleeve-shaped pivot member, and a locking member extending through said last mentioned opening into said slot and having curved ends pressing against the curved inner walls of said sleeve-shaped pivot member and of said slot.

4. In a pivotal chain link connection, in combination, chain links having openings in their adjacent ends for receiving a pivot member, a pivot member extending through said openings and having at least an annular portion adjacent one of its ends received within one of said openings, and means for locking said pivot member within said openings including a recess formed in the one of said links whose opening receives said annular portion and through the wall of the opening receiving the annular portion of said pivot member, said recess having a curved inner wall, an opening through the side of the annular portion of said pivot member, and a locking member extending through said last mentioned opening and firmly engaging the curved wall of said recess and the inner wall of the annular portion of said pivot member.

5. In a chain link connection, in combination, a chain link having spaced parallel leg portions, alined openings in said leg portions adjacent the ends of the latter, a chain link extending between said leg portions and having an opening in alinement with the openings in said leg portions, an annular pivot member extending through said openings in said chain links; and means for locking said pivot member within said openings including a slot formed in one of said leg portions through the wall of the opening therein and having a curved inner wall, an opening extending through the side of said annular pivot member, and a locking member extending through said last mentioned opening and having curved end surfaces firmly engaging the inner walls of said pivot member and of said slot.

6. In a chain, a link having an opening therein, a hollow pivot member received in said opening, a radial opening through the wall of said pivot member, a recess in the link extending through the wall of the opening therein and communicating with said radial opening, and a locking element received at one end in said radial opening and in said recess and precluded from rectilinear withdrawal from said recess by abutment of its other end with a wall of said hollow pivot member.

7. In a chain, a tubular pivot member, a link having an opening to receive said tubular pivot member, a slot in the link extending through the wall of said opening, a radial opening in said tubular pivot member opposite said slot, a deformable locking element extending within said slot and said radial opening, and relatively stationary surfaces engageable by the end surfaces of said locking element for holding the latter within said slot and said radial opening.

8. In a chain, a link having a bore therein, a pivot pin received in said bore, said pin having an opening adjacent one end thereof at one side thereof and formed so that an element received in said opening perpendicular to the axis of the pin may extend completely across the end of the pin, said link having a recess opening into its bore in line with said opening, and a locking element passing through said opening and received at one of its ends in said recess and having its other end engaged with the side of said bore opposite said opening, to preclude escape of said locking element.

9. In a chain, a link having a bore therein, a pivot pin received in said bore, said pivot pin having a recess in one end, a passage extending longitudinally of said pin and opening into said recess to permit access of a drift to the bottom of said recess, said recess having a wall traversed by a radial opening and said link having a recess communicating with said bore opposite said opening, and a locking element traversing said opening and at its opposite ends engaging the bottom of said second mentioned recess and the wall of said first mentioned recess at a point opposite said second mentioned recess and overlying said passage at the point of communication of the latter with said first mentioned recess.

10. In a chain, a link element having a bore therein, a pivot pin element received in said bore, said link element having a recess opening into said bore and said pivot pin element having an opening at one side thereof in radial alinement with said recess, a locking member extending through said opening and engaging the bottom of said recess with one of its end surfaces, and a surface on one of said elements engageable by the other end surface of said locking member for precluding escape of said locking member.

11. In a chain, a link having a bore therein, a pivot pin received in said bore, said pivot pin having a recess in one end, a passage extending longitudinally of said pin in eccentric relation thereto and opening into said recess to permit access of a drift to the bottom of said recess, said recess having a wall traversed by a radial opening and said link having a recess opening into said bore opposite said opening, and a locking element traversing said opening and at its opposite ends engaging the bottom of said second mentioned recess and the wall of said first mentioned recess at a point opposite said second mentioned recess and overlying said passage at the point of communication of the latter with said first mentioned recess.

12. In a chain, a link element having an opening therein, a pivot pin element received in said opening, a recess in said link element communicating with said opening, an opening extending transversely through said pivot pin element and communicating with said recess, a deformable locking member extending through said last mentioned opening into said recess and engaging the bottom of said recess with one of its end surfaces, and a surface on one of said elements engageable by the other end surface of said locking member when the latter has its axis lying in a straight line throughout its length for precluding escape of said locking member.

13. In a chain, a link element having an opening therein, a pivot pin element received in said opening, a recess in said link element communicating with said opening, an opening extending transversely through the surface of said pivot pin element adjacent said recess and communicating with the latter, and a deformable locking member extending through said last mentioned opening into said recess and held by a wall of said last mentioned opening against escape in a direction transverse to said member, said locking member and one of said elements having mutually oppositely facing surfaces engageable with each other for holding said member against withdrawal from said recess and said second mentioned opening when said member is bent to position said surfaces opposite each other.

14. In a chain, a link element having an opening therein, a pivot element received within said opening, said link element having a recess communicating with said opening through a wall of the latter and said pivot element having a recess extending into the portion of said pivot elements received within said opening, and means for locking said pivot element within said opening including a locking member having one end engageable with the bottom of said first mentioned recess and having its other end received within said second mentioned recess and engageable with an oppositely directed surface on one of said elements.

15. In a chain, a link element having an opening therein, a pivot element received within said opening, said link element having a recess communicating with said opening through a wall of the latter and said pivot element having a wall portion opposite said recess and traversed by an opening communicating with said recess, and said pivot element having a recess therein with which said second opening communicates, and a locking member extending through said second opening into each of said recesses and of such length that it cannot be freed from either recess, while extending through said second opening, without flexure out of line with the direction of said second opening.

16. In a chain, chain elements pivotally connected together, a pivot element for pivotally connecting said chain elements and having a recess, and locking means for said pivot element for locking the same against rotation relative to one of said chain elements including communicating openings in said pivot element and said one of said chain elements, a locking portion received in said openings for interlocking said pivot element and said one of said chain elements, said locking means including another portion flexible relative to said locking portion and arranged in the recess in said pivot element for holding said locking portion in locking position, said flexible portion when flexed permitting release of said locking portion from the opening in said one of said chain elements.

17. In a chain, chain elements pivotally connected together, a pivot element for pivotally connecting said chain elements and having a recess, said pivot element and one of said chain elements having openings disposed in registry, and a locking device including locking means disposed in said openings for locking said pivot element against rotation relative to said one of said chain elements, said locking device also including flexible means arranged within said recess in said pivot element for holding said locking means in locking position and flexible to effect release of said locking means from the opening in said one of said chain elements.

18. In a chain, a link element having a bore therein, a pivot pin element received in said bore, and means for holding said pivot pin element from longitudinal withdrawal from said bore and preventing rotation thereof in said bore including a locking member which extends when in locking position generally diametrically with respect to the pivot pin element, and which includes portions which extend, when said locking member is in locking position, respectively outwardly beyond one side of said pivot pin element and, in the opposite direction, a substantial distance towards the opposite side of said pivot pin element, and which has cooperating therewith at points spaced from the relatively remote ends of said portions thereof means for holding the same against translational movement relative to said pivot pin element in a direction longitudinally of said pivot pin element, said link element having a recess for receiving the projecting portion of said locking member, said recess communicating with said bore through a circumferential wall of the latter, and said pivot pin element formed, in the portion thereof which is received within the bore in said link element when the parts are in assembled relation, to receive the remaining portion of said locking member.

HARRY H. VANDERZEE.